US008625560B2

(12) United States Patent
Han et al.

(10) Patent No.: US 8,625,560 B2
(45) Date of Patent: Jan. 7, 2014

(54) METHOD AND APPARATUS FOR FEEDING BACK CHANNEL QUALITY INFORMATION IN MULTI-USER MULTI-INPUT MULTI-OUTPUT COMMUNICATION SYSTEM

(75) Inventors: Jung-Su Han, Yongin-si (KR); Inkyu Lee, Seoul (KR); Hi-Chan Moon, Yongin-si (KR); Seong-Hyeon Moon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 91 days.

(21) Appl. No.: 13/306,217

(22) Filed: Nov. 29, 2011

(65) Prior Publication Data

US 2012/0140655 A1     Jun. 7, 2012

Related U.S. Application Data

(60) Provisional application No. 61/418,993, filed on Dec. 2, 2010.

(30) Foreign Application Priority Data

Jul. 21, 2011    (KR) ........................ 10-2011-0072395

(51) Int. Cl.
*H04W 24/10*    (2009.01)
(52) U.S. Cl.
USPC ........................................................ 370/338
(58) Field of Classification Search
USPC ........... 370/203, 208, 328–338; 375/260, 267
See application file for complete search history.

(56) References Cited

U.S. PATENT DOCUMENTS

2008/0256163 A1* 10/2008 Clerckx et al. ................ 708/607
2011/0164668 A1*  7/2011 Hoek et al. .................... 375/224

OTHER PUBLICATIONS

Nihar Jindal, MIMO Broadcast Channels with Finite-Rate Feedback, IEEE Transactions on Information Theory, vol. 52, pp. 5045-5060, Mar. 16, 2006.
Taesang Yoo et al., Multi-Antenna Downlink Channels with Limited Feedback and User Selection, IEEE Journal on Selected Areas in Communications, vol. 25, pp. 1478-1491, Sep. 2007.
Niranjay Ravindran et al., Limited Feedback-Based Block Diagonalization for the MIMO Broadcast Channel, IEEE Journal on Selected Areas in Communications, vol. 26, pp. 1473-1482, Nov. 21, 2007.
Nihar Jindal, Antenna Combining for the MIMO Downlink Channel, IEEE Transactions on Wireless Communications, vol. 7, pp. 3834-3844, Oct. 2008.
Matteo Trivellato et al., On Transceiver Design and Channel Quantization for Downlink Multiuser MIMO Systems with Limited Feedback, IEEE Journal on Selected Areas in Communications, vol. 26, pp. 1494-1504, Oct. 2008.

* cited by examiner

*Primary Examiner* — Pao Sinkantarakorn
(74) *Attorney, Agent, or Firm* — Jefferson IP Law, LLP

(57) ABSTRACT

A method for feeding back Channel Quality Information (CQI) by a terminal in a Multi-User Multi-Input Multi-Output (MU-MIMO) communication system is provided. The method includes receiving a signal from a base station, determining a lower limit of an average Signal to Interference plus Noise Ratio (SINR) for the received signal, and determining the lower limit of an average SINR as CQI, and feeding back the CQI to the base station.

14 Claims, 4 Drawing Sheets

METHOD AND APPARATUS FOR FEEDING BACK CHANNEL QUALITY INFORMATION IN MULTI-USER MULTI-INPUT MULTI-OUTPUT COMMUNICATION SYSTEM

PRIORITY

This application claims the benefit under 35 U.S.C. §119(e) of a United States Provisional patent application filed in the United States Patent and Trademark Office on Dec. 2, 2010 and assigned Ser. No. 61/418,993, and the benefit under 35 U.S.C. §119(a) of a Korean patent application filed in the Korean Intellectual Property Office on Jul. 21, 2011 and assigned Serial No. 10-2011-0072395, the entire disclosure of each of which is hereby incorporated by reference.

BACKGROUND OF THE INVENTION

1. Field of the Invention

The present invention relates to a method and apparatus for feeding back Channel Quality Information (CQI) in a Multi-User Multi-Input Multi-Output (MU-MIMO) communication system.

2. Description of the Related Art

Recently, in the field of wireless communication systems, many studies have been conducted on Down-Link (DL) channels in a Multi-User Multi-Input Multi-Output (MU-MIMO) communication system in which one base station supports multiple users simultaneously. In the DL channels, inter-user interference is a large problem. To address this problem, Zero-Forcing (ZF) beamforming and Block Diagonalization (BD) for designing a precoder have been widely used. In the precoder design, acquiring correct information about DL channels by a transmitting side is a precondition. Based on this information, a receiving side performs a user's scheduling algorithm, making it possible to obtain a higher sum-rate performance.

In a wireless communication environment, however, it is difficult for a transmitting side to acquire correct information about DL channels. Therefore, a receiving side quantizes information about a channel to a transmitting side based on a codebook it has recognized in advance, and transmits, to the transmitting side, Channel Direction Information (CDI) which is a quantized codebook index. The CDI represents a direction of the channel. Upon receiving the CDI, the transmitting side may design a precoder for cancelling interference of the channel based on the CDI.

In the MU-MIMO communication system, if multiple users exist, performance gain or multi-user diversity gain may be obtained by assigning users appropriate for the transmission environment. To this end, a user transmits to the transmitting side not only the CDI for its own channel but also Channel Quality Information (CQI) corresponding to characteristics of the channel. Upon receiving the CDI and CQI transmitted from the user, the transmitting side may perform more efficient scheduling based on the CDI and the CQI.

In one scheme according to the related art, when a receiving side with one antenna performs scheduling in a vector channel, this scheme analyzes ZF beamforming performance. In another scheme according to the related art, when a receiving side has multiple antennas, this scheme obtains performance gain by reducing errors caused by channel quantization by means of combining at the receiving side. In a further scheme according to the related art, a scheduling gain is obtained by reflecting quantization errors in CQI. The above schemes according to the related art have constraints in which each user should perform communication only through one data layer, i.e., should perform single-mode communication.

In a proposed scheme, during multi-mode communication in which a transmitting side supports multiple data layers for a user, this scheme uses the BD technique. In this case, the BD technique is used based on only the CDI, for a specified user, and the CQI representation technique for multi-user scheduling has never been considered. A user may measure its channel magnitude, and use the measured channel magnitude as CQI. In this case, in a limited feedback situation, quantization errors may not be reflected, causing performance degradation.

Therefore, in the MU-MIMO communication system, when channel information is transmitted to a transmitting side using a codebook, CQI representation distinguishable from that of a system supporting only one user is required.

SUMMARY OF THE INVENTION

Aspects of the present invention are to address at least the above-mentioned problems and/or disadvantages and to provide at least the advantages described below. Accordingly, an aspect of the present invention is to provide a method and apparatus for feeding back Channel Quality Information (CQI) by a transmitter in a Multi-User Multi-Input Multi-Output (MU-MIMO) communication system.

Another aspect of the present invention is to provide a method and apparatus for determining an average Signal to Interference plus Noise Ratio (SINR) as CQI to maximize scheduling gain in a MU-MIMO communication system that uses precoding to support multi-stream transport.

In accordance with an aspect of the present invention, a method for feeding back CQI by a terminal in a MU-MIMO communication system is provided. The method includes receiving a signal from a base station, determining a lower limit of an average SINR for the received signal, and determining the lower limit of an average SINR as CQI, and feeding back the CQI to the base station.

In accordance with another aspect of the present invention, a terminal for feeding back CQI in a MU-MIMO communication system is provided. The terminal includes a receiver for receiving a signal from a base station, an average SINR calculator for determining a lower limit of an average SINR for the received signal, and determining the lower limit of an average SINR as CQI, and a transmitter for feeding back the CQI to the base station.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention provide a Channel Quality Information (CQI) calculation method and apparatus for maximizing a scheduling gain in a Multi-User Multi-Input Multi-Output (MU-MIMO) communication system in which a transmitting side uses precoding to support multi-stream transport. In a scheduling technique, a Semi-orthogonal User Selection (SUS) technique is considered. The exemplary embodiments of present invention provide a new CQI calculation method and apparatus for minimizing possible interference to other users taking into account not only an existing channel norm (or channel magnitude) but also errors occurring due to codebook quantization.

Figure 1:
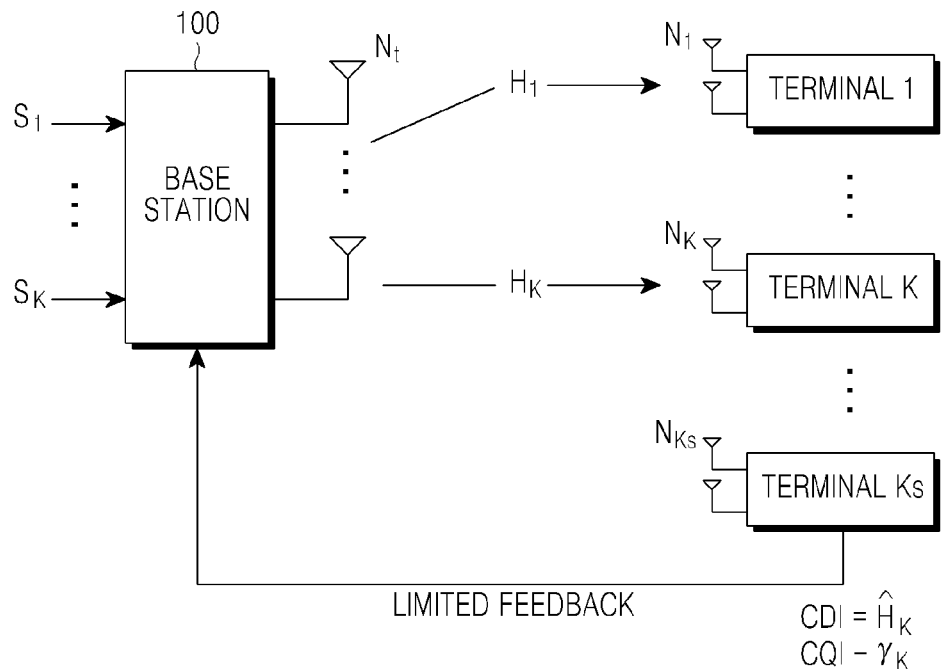
FIG. 1 illustrates a configuration of a Multi-User Multi-Input Multi-Output (MU-MIMO) communication system according to an exemplary embodiment of the present invention.

FIG. 1 illustrates a configuration of a MU-MIMO communication system according to an exemplary embodiment of the present invention. It is assumed herein that there is a single-cell MIMO broadcast channel, and there is one base station 100 and $K_s$ terminals.

Referring to FIG. 1, when the base station 100 selects K terminals among $K_s$ terminals, and transmits information to the selected K terminals simultaneously, a received signal of a k-th terminal is represented by Equation (1) below.

$$y_k = H_k^H T_k s_k + \sum_{j=1, j \neq k}^{K} H_k^H T_j s_j + n_k \quad (1)$$

where $H_k$ represents a channel matrix for a k-th terminal having a size of $N_t \times N_r$, $N_t$ represents the number of transmit antennas of the base station 100, $N_r$ represents the number of receive antennas of each terminal, and $s_k$ represents an information vector transmitted to a k-th terminal having a size of $N_s$. In other words, $N_s$ data streams are transmitted to the k-th terminal. $T_k$ represents a precoding matrix having a size of $N_t \times N_s$.

The precoding matrix $T_k$ is determined using a Block Diagonalization (BD) technique ($H_k^H T_j = 0$) such that the signal transmitted by another terminal should not be received at a k-th terminal The BD technique receives data streams, the number of which corresponds to the number of receive antennas. Although the BD technique is used in an exemplary embodiment of the present invention by way of example, it should be noted that the present invention is not limited to the BD technique. In other words, an exemplary embodiment of the present invention may be applied to an example of receiving data streams, the number of which is greater than or less than the number of receive antennas.

In this case, a Signal to Interference plus Noise Ratio (SINR) at a receiver of a k-th terminal is represented by Equation (2) below.

$$SINR_k = \frac{\rho Tr(H_k^H T_k T_k^H H_k)}{1 + \sum_{j \neq k} \rho Tr(H_k^H T_j T_j^H H_k)}, \quad (2)$$

where $$\rho = P/N_t$$

However, the receiver of the k-th terminal may not acquire an instantaneous SINR, because it cannot recognize another terminal's channels $H_k^H T_j$ except for its channel $H_k^H T_k$. Therefore, in an exemplary embodiment of the present invention, an average SINR is determined by averaging $\Sigma_{j \neq k} \rho Tr(H_k^H T_j T_j^H H_k)$ in Equation (2).

(1) Calculation of Average SINR

In an exemplary embodiment of the present invention, a receiver of a k-th terminal uses an average SINR instead of an instantaneous SINR as CQI information, assuming that the receiver does not know another terminal's channels $H_k^H T_j$ except for its channel $H_k^H T_k$. A lower limit of the average SINR is determined by Equation (3) below.

$$E(SINR_k) \geq \frac{\rho Tr(H_k^H T_k T_k^H H_k)}{1 + \sum_{j \neq k} \rho Tr(E(H_k^H T_j T_j^H H_k))} \quad (3)$$

$$= \frac{\rho Tr(\Lambda_k \tilde{H}_k^H T_k T_k^H \tilde{H}_k)}{1 + \sum_{j \neq k} \rho Tr(\Lambda_k E(\tilde{H}_k^H T_j T_j^H \tilde{H}_k))}$$

$H_k H_k^H = \tilde{H}_k \Lambda_k \tilde{H}_k^H$ represents an Eigen-value decomposition for $H_k H_k^H$. $\tilde{H}_k$ has an orthogonal basis of $H_k$, i.e., $\tilde{H}_k^H \tilde{H}_k = I_{N_r}$. In addition, $\Lambda_k = diag(\lambda_1, \ldots \lambda_N)$, where $\lambda_i$ is an i-th Eigen-value of $H_k H_k^H$.

The following description corresponds to preliminary procedures needed to determine a denominator term and a numerator term of Equation (3).

(2) Preliminary $\tilde{H}_k$ is decomposed as shown in Equation (4) below.

$$\tilde{H}_k = \overline{H}_k \Lambda_k B_k + S_k C_k \quad (4)$$

where $\overline{H}_k$ represents one codeword in a codebook having a size of $N_r \times N_r$. The codebook includes $2^B$ codewords. $S_k$ has an orthogonal basis of a left-null space of $\overline{H}_k$. $C_k$ is an $N_r \times N_r$ upper triangular matrix, and its diagonal terms are all positive numbers and satisfy $\mathrm{Tr}(C_k^H C_k) = d^2(\tilde{H}_k, \overline{H}_k)$. $\Lambda_k$ is an $N_r \times N_r$ unitary matrix. $B_k$ is an $N_r \times N_r$ upper triangular matrix, and its diagonal terms are all positive numbers and satisfy $B_k^H B_k = I_N - C_k^H C_k$.

A weighted chordal distance to be used in the below-described equation development is defined as Equation (5) below.

$$d^2(F_1, F_2; D) = \mathrm{Tr}(D) - \mathrm{Tr}(D F_1^H F_2 F_2^H F_1) \quad (5)$$

The weighted chordal distance satisfies a triangle law of $d(F_1, F_2; D) \leq d(F_2, F_3; D) + d(F_3, F_1; D)$.

A process of determining a numerator term of Equation (3) is as follows.

(3) Calculation of Numerator Term of Average SINR (Desired Signal)

A numerator term of the average SINR is represented by Equation (6) below using the definition of the weighted chordal distance and the triangle law.

$$\mathrm{Tr}\left(\Lambda_k \tilde{H}_k^H T_k T_k^H \tilde{H}_k\right) \geq \mathrm{Tr}(\Lambda_k) - \left(d(\overline{H}_k, \tilde{H}_k; \Lambda_k) + d(T_k, \overline{H}_k; \Lambda_k)\right)^2 \geq \quad (6)$$

$$\mathrm{Tr}(\Lambda_k) - \left(\sqrt{\mathrm{Tr}(\Lambda_k C_k^H C_k)} + \kappa\right)^2$$

In the second inequality of Equation (6), $d^2(\overline{H}_k, \tilde{H}_k; \Lambda_k) = \mathrm{Tr}(\Lambda_k C_k^H C_k)$, and $d(T_k, \overline{H}_k; \Lambda_k)$ is defined as $\kappa$.

A scheduler of the base station 100 selects as scheduling targets the terminals having an orthogonal channel matrix if possible, among the terminals. Through this selection operation, it is possible to prevent performance degradation caused by rank deficiency occurring during generation of a precoding matrix. Therefore, matrixes for individual terminals are orthogonal with each other, so a precoding matrix for a k-th user is very similar to an original channel matrix ($T_k \approx \overline{H}_k$). As a result, since $\kappa = d(T_k, \overline{H}_k; \Lambda_k)$ approximates to '0', $\kappa$ in Equation (5) will be assumed as '0' in an exemplary embodiment of the present invention.

A process of determining a denominator term of Equation (3) is as follows.

(4) Calculation of Denominator Term of Average SINR (Interference Signal)

A denominator term of an average SINR of Equation (3) is developed as shown in Equation (7) below.

$$\rho \mathrm{Tr}\left(\Lambda_k E\left(\tilde{H}_k^H T_j T_j^H \tilde{H}_k\right)\right) = \rho \mathrm{Tr}(\Lambda_k C_k^H E(S_k^H T_j T_j^H S_k) C_k) \quad (7)$$

$$= \frac{\rho N_r}{N_t - N_r} \mathrm{Tr}(\Lambda_k C_k^H C_k)$$

The first equality of Equation (7) is determined using decomposition of $\tilde{H}_k$ represented by Equation (4).

$T_j$ and $S_k$ are distributed on a left-null space of $\overline{H}_k$ in a uniform manner by definition. Therefore, $S_k^H T_j T_j^H S_k$ follows a beta distribution, and $$E[S_k^H T_j T_j^H S_k] = \frac{N_r}{N_t - N_r} I_{N_r}$$

is given by a definition of the beta distribution.

(5) Lower Limit of Average SINR and its Consideration

A lower limit of an average SINR is determined using the values determined in Equations (4) to (6), and represented by Equation (8) below.

$$E(SINR_k) \geq \frac{\rho \mathrm{Tr}(\Lambda_k) - \left(d(\Lambda_k, \overline{H}_k, \tilde{H}_k) + d(\Lambda_k, T_k, \overline{H}_k)\right)^2}{1 + (K-1)\frac{\rho N_r}{N_t - N_r}\mathrm{Tr}(\Lambda_k C_k^H C_k)} \quad (8)$$

$$= \frac{\rho \mathrm{Tr}(\Lambda_k) - \rho\left(\sqrt{\mathrm{Tr}(\Lambda_k C_k^H C_k)} + k\right)^2}{1 + \rho \mathrm{Tr}(\Lambda_k C_k^H C_k)}$$

$$\triangleq \gamma_k^{sinr}(k)$$

The second equality of Equation (8) is satisfied since $K = N_t/N_r$. A lower limit of an average SINR is determined depending on $\rho$ representing a power level of each stream. The determined lower limit $\gamma_k^{sinr\ r}(\kappa)$ of an average SINR is determined as a CQI.

More specifically, if $\rho \to 0$ (i.e., if a Signal to Noise Ratio (SNR) is very low), the average SINR is approximated to $\rho\{\mathrm{Tr}(\Lambda_k) - d^2(\overline{H}_k, \tilde{H}_k; \Lambda_k)\}$. If the number of quantized bits is greater than or equal to 3, $d^2(\overline{H}_k, \tilde{H}_k; \Lambda_k)$ is significantly less than $\mathrm{Tr}(\Lambda_k)$. Therefore, an average SINR is determined by $\mathrm{Tr}(\Lambda_k)$. Eventually, the system according to an exemplary embodiment of the present invention is equal to an existing feedback system that uses a channel magnitude $\|H_k\|^2 = (\Lambda_k)$ as CQI information.

On the other hand, if $\rho \to \infty$ (i.e., if SNR is very high), the average SINR is approximated to $$\frac{\mathrm{Tr}(\Lambda_k) - d^2(\overline{H}_k, \tilde{H}_k; \Lambda_k)}{d^2(\overline{H}_k, \tilde{H}_k; \Lambda_k)}.$$

Therefore, an average SINR is determined mainly by $d^2(\overline{H}_k, \tilde{H}_k; \Lambda_k)$ (i.e., quantization error) of the denominator term. Therefore, in the case of a high SNR, the existing scheme using $\|H_k\|^2$ as CQI information could not avoid performance degradation at the high SNR during user scheduling because it does not consider the magnitude of quantization error. However, the scheme according to an exemplary embodiment of the present invention may ensure proper performance not only at a low SNR but also at a high SNR because it uses an average SINR as CQI information.

Figure 2:
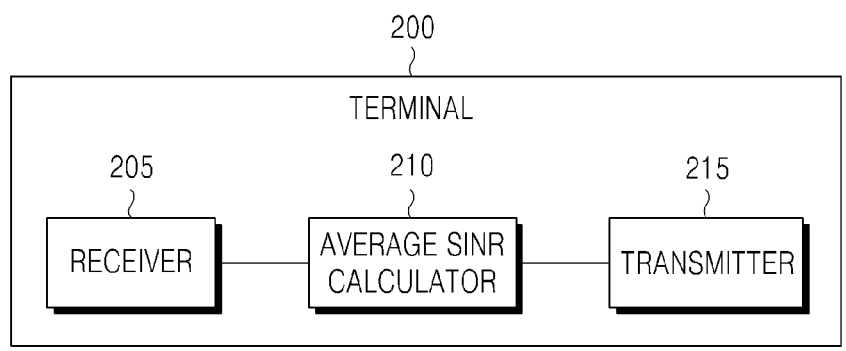
FIG. 2 illustrates a schematic structure of a terminal according to an exemplary embodiment of the present invention.

FIG. 2 illustrates a schematic structure of a terminal according to an exemplary embodiment of the present invention.

Referring to FIG. 2, a terminal 200 includes a receiver 205, an average SINR calculator 210, and a transmitter 215.

The receiver 205 receives data streams transmitted from a base station, and delivers them to the average SINR calculator 210. The average SINR calculator 210 determines a lower limit of an average SINR for the received data streams using Equation (8), and delivers the lower limit to the transmitter 215. The transmitter 215 transmits, as CQI information, the determined lower limit of an average SINR to the base station.

Figure 3:
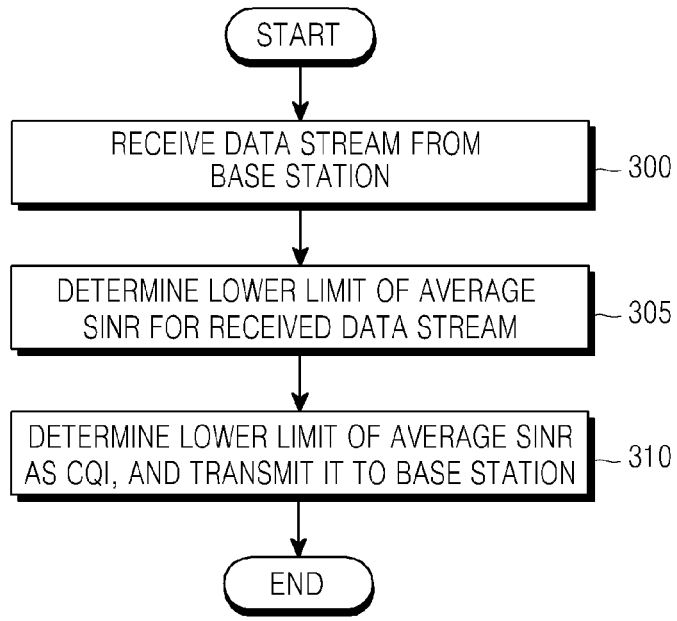
FIG. 3 illustrates an operation of a terminal according to an exemplary embodiment of the present invention.

FIG. 3 illustrates an operation of a terminal according to an exemplary embodiment of the present invention.

Referring to FIG. 3, in step 300, the terminal receives data streams transmitted from a base station. In step 305, the terminal determines a lower limit of an average SINR for the received data streams using Equation (8). In step 310, the terminal transmits, as CQI information, the determined lower limit of an average SINR to the base station.

Figure 4:
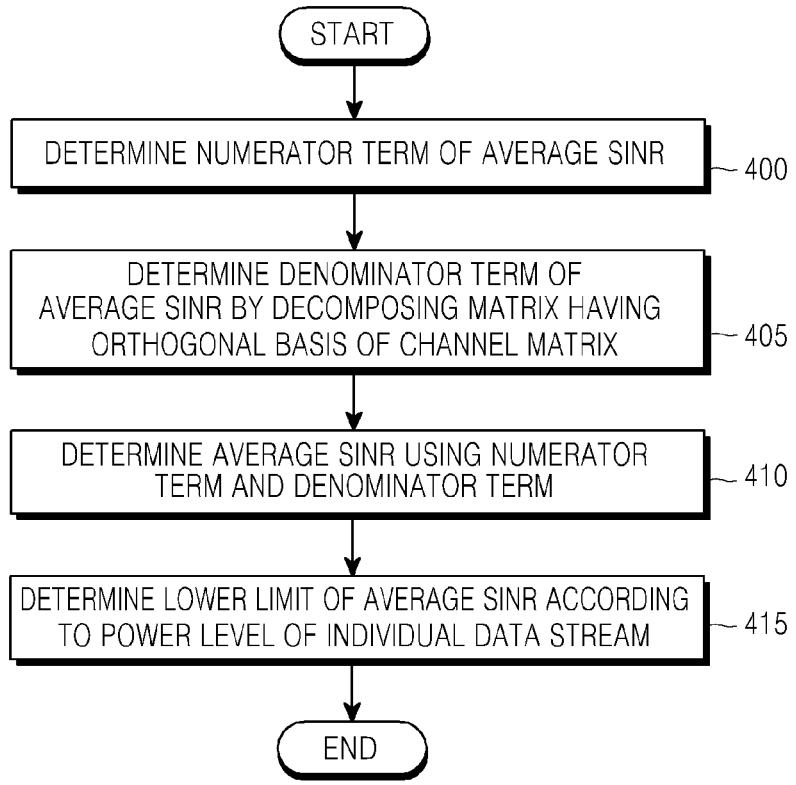
FIG. 4 illustrates an operation of determining a lower limit of an average Signal to Interference plus Noise Ratio (SINR) by a terminal according to an exemplary embodiment of the present invention.

FIG. 4 illustrates an operation of determining a lower limit of an average SINR by a terminal according to an exemplary embodiment of the present invention.

Referring to FIG. 4, in step 400, the terminal determines a numerator term of an average SINR using a definition of a weighted chordal distance represented as shown in Equation (5) and a triangle law.

In step 405, the terminal determines a denominator term of an average SINR by decomposing a matrix having an orthogonal basis of a channel matrix.

In step 410, the terminal determines an average SINR using the determined numerator term and denominator term. In step 415, the terminal determines a lower limit of the average SINR depending on a power level of each of the data streams received from a base station.

With reference to FIGS. 5 to 8, performance gain of the technique according to an exemplary embodiment of the present invention will be described based on simulation results obtained from an average SINR determined according to an exemplary embodiment of the present invention. In the simulation results, the BD technique was used for precoding, and the SUS algorithm was used for scheduling.

Figure 5:
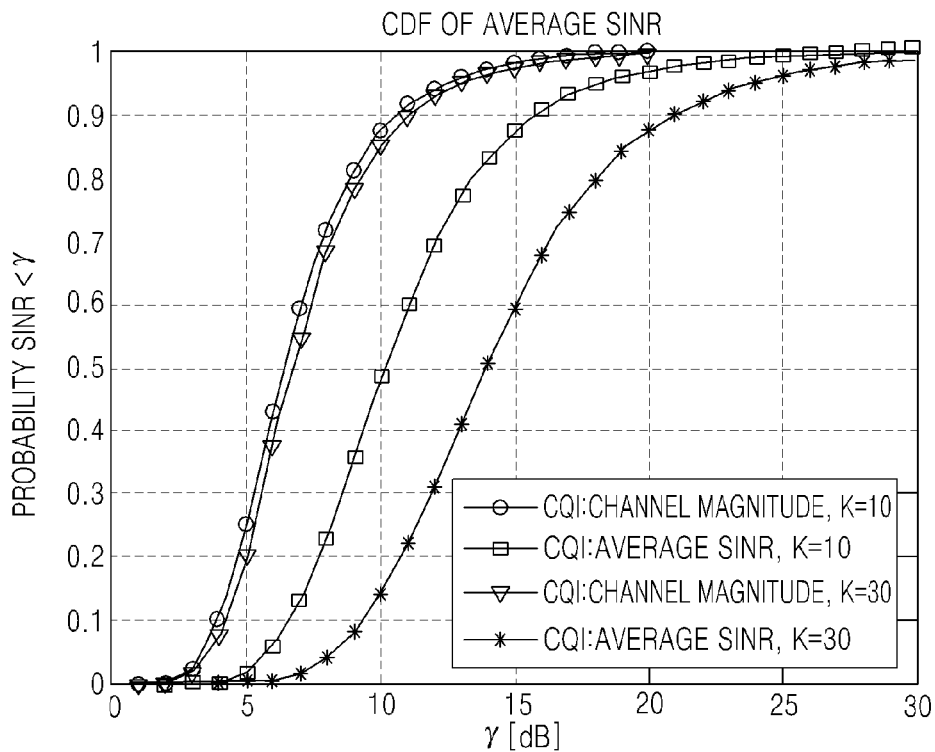
FIG. 5 is a graph illustrating a Cumulative Distribution Function (CDF) of an average SINR according to an exemplary embodiment of the present invention.

FIG. 5 is a graph illustrating a Cumulative Distribution Function (CDF) of an average SINR according to an exemplary embodiment of the present invention. It is assumed herein that $N_t$ is 4, $N_r$ is 2, and an SNR is 20 dB when 10 bits are used for CDI.

Referring to FIG. 5, a CDF for an average SINR of scheduled users is illustrated. A comparison is made between one case where the number of users is 10 (K=10) and another case where the number of users is 30 (K=30). As a result of comparing performance gain obtained based on a channel magnitude used as CQI with performance gain obtained based on an average SINR used as CQI in each of one case where the number of users is 10 and another case where the number of users is 30, it is noted as illustrated in the graph that performance gain obtained based on an average SINR used as CQI is remarkably higher than performance gain obtained based on a channel magnitude used as CQI. In other words, in the case where a channel magnitude is used as CQI, even though the number of users increases, a change in multi-user diversity gain is insignificant. On the other hand, in the case where an average SINR is used as CQI, the SINR increases with the number of users, contributing to an increase in performance gain. Therefore, an actual SINR may be accurately predicted based on the average SINR's lower limit determined according to an exemplary embodiment of the present invention.

Figure 6:
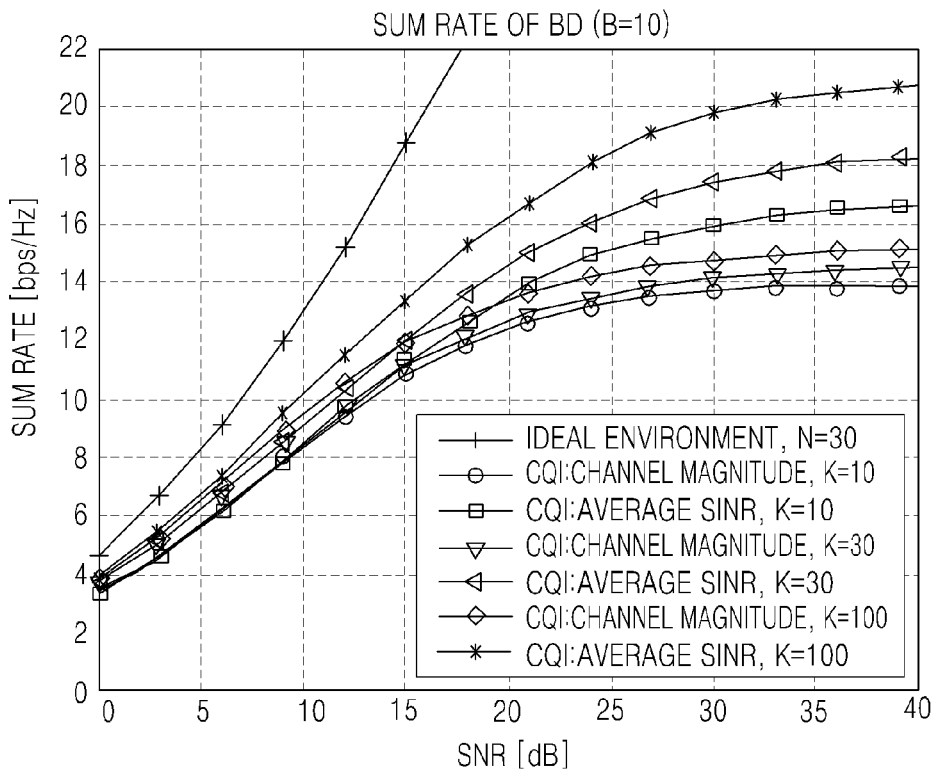
FIG. 6 is a graph illustrating a sum rate associated with a number of users according to an exemplary embodiment of the present invention.

FIG. 6 is a graph illustrating a sum rate associated with a number of users according to an exemplary embodiment of the present invention. It is assumed herein that $N_t$=4, and $N_r$=2, and 10 bits are used for CDI.

Referring to FIG. 6, compared with an ideal environment, in a limited feedback environment, a sum rate is limited as transmission power becomes higher due to interference caused by quantization error. If SNR is high, gains obtained for K=30 and K=100 (where K represents the number of users) are 30% and 40%, respectively. In other words, if SNR is high, a sum rate is significantly affected by interference. In this case, if a channel magnitude is used as CQI, interference caused by quantization error may not be reflected, causing a low sum rate compared with when an average SINR is used as CQI according to an exemplary embodiment of the present invention.

Figure 7:
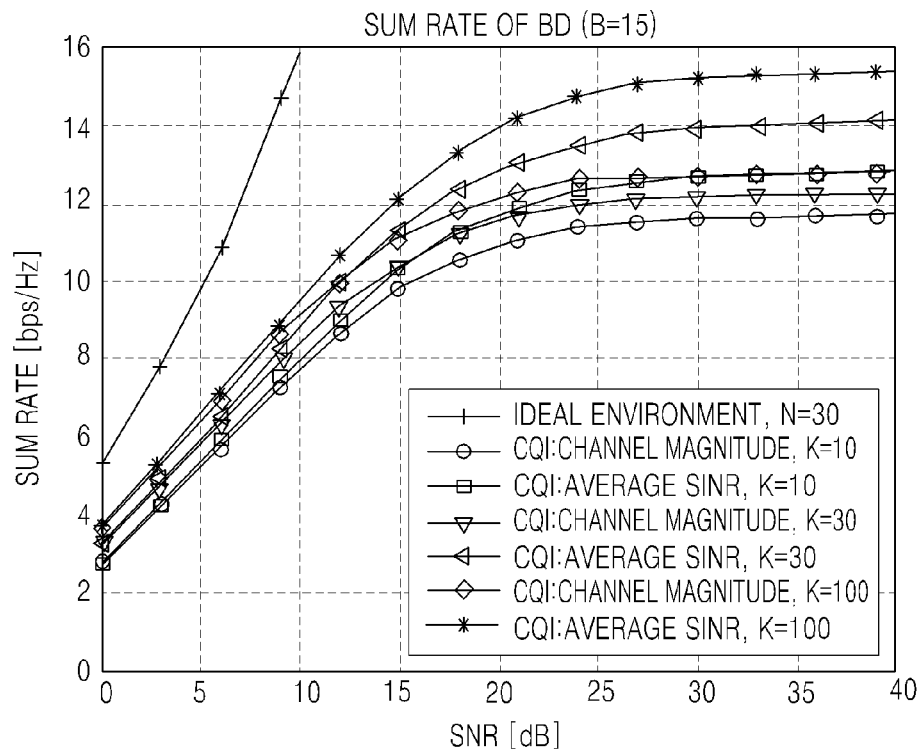
FIG. 7 is a graph illustrating a sum rate associated with a number of users according to an exemplary embodiment of the present invention.

FIG. 7 is a graph illustrating a sum rate associated with a number of users according to an exemplary embodiment of the present invention. It is assumed herein that $N_t$=6, and $N_r$=2, and 15 bits are used for CDI.

Referring to FIG. 7, like in FIG. 6, if a channel magnitude is used as CQI, interference caused by quantization error may not be reflected. Therefore, for each of K=30 and K=100 (where K represents the number of users), one case where an average SINR is used as CQI according to an exemplary embodiment of the present invention is higher in gain by 20% than another case where a channel magnitude is used as CQI according to the related art.

Figure 8:
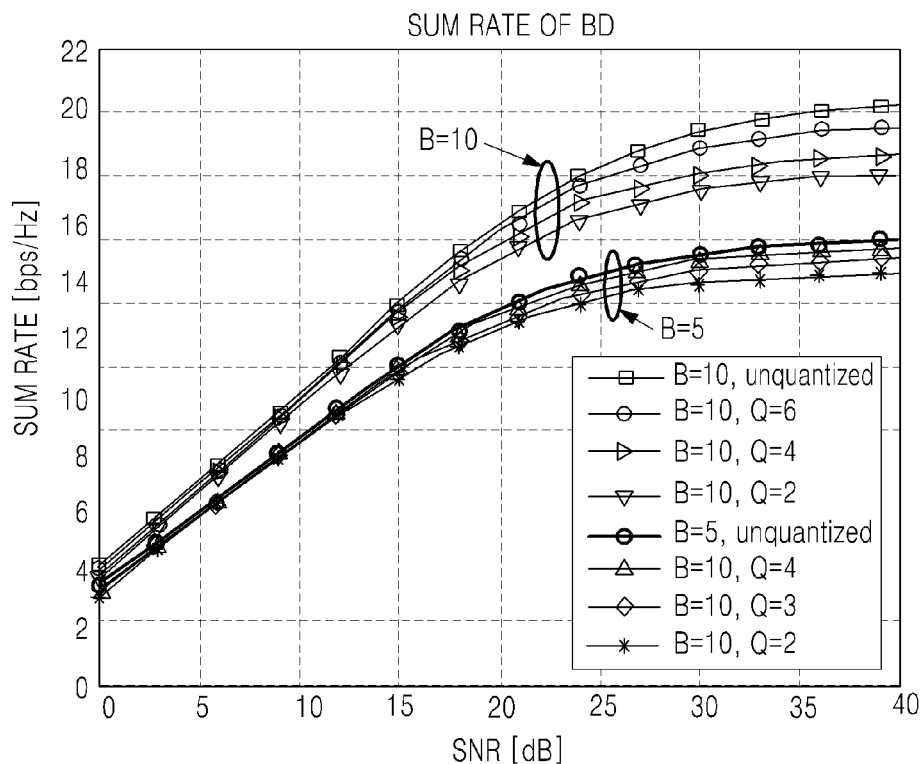
FIG. 8 is a graph illustrating a sum rate associated with a number of bits for Channel Direction Information (CDI) and a number of quantized bits according to an exemplary embodiment of the present invention.

FIG. 8 is a graph illustrating a sum rate associated with a number of bits for CDI and a number of quantized bits according to an exemplary embodiment of the present invention. It is assumed herein that $N_t$=4, $N_r$=2 and 5 and 10 bits are used for CDI.

Referring to FIG. 8, for each of one case where 5 bits are used for CDI and another case where 10 bits are used for CDI, the number of quantized bits is changed to 2, 4, 6, and unquantized. As a result, one case where 5 bits are used for CDI is lower in sum rate than another case where 10 bits are used for CDI. When the same number of bits is used for CDI, a sum rate increases with the number of quantized bits. For example, when 10 bits are used for CDI, the number of quantized bits increases to avoid a loss caused by quantization.

As is apparent from the foregoing description, in the MU-MIMO communication system, if a transmitting side uses precoding to support multi-stream transport, a receiving side determines a lower limit of an average SINR as CQI for maximizing scheduling gain and feeds back the determined lower limit of an average SINR to a base station, thereby providing more accurate CQI to the base station and thus allowing the base station to estimate a channel more accurately.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for feeding back Channel Quality Information (CQI) by a terminal in a Multi-User Multi-Input Multi-Output (MU-MIMO) communication system, the method comprising:
   receiving a signal from a base station;
   determining a lower limit of an average Signal to Interference plus Noise Ratio (SINR) for the received signal; and
   determining the lower limit of an average SINR as CQI, and feeding back the CQI to the base station,
   wherein the determining of the lower limit of an average SINR comprises determining a numerator term of the average SINR using a definition of a weighted chordal distance and a triangle law.

2. The method of claim 1, wherein the determining of the lower limit of an average SINR further comprises:
   determining a denominator term of the average SINR using decomposition of a matrix having an orthogonal basis of a channel matrix for a channel established to the base station;
   determining the average SINR using the determined numerator term and denominator term; and determining a lower limit of the average SINR depending on a power level of the signal transmitted from the base station.

3. The method of claim 2, wherein the determining of the denominator term of the average SINR comprises performing the decomposition of a matrix using a codeword constituting a codebook, a matrix having an orthogonal basis of a left-null space of the codeword, an upper triangular matrix of the codeword, and a unitary matrix.

4. The method of claim 1, wherein the terminal does not recognize channels between the base station and other terminals except for the established channel.

5. The method of claim 1, wherein the CQI is used by the base station to generate a precoding matrix defined by a block diagonalization technique.

6. A terminal for feeding back Channel Quality Information (CQI) in a Multi-User Multi-Input Multi-Output (MU-MIMO) communication system, the terminal comprising:
 a receiver for receiving a signal from a base station;
 an average Signal to Interference plus Noise Ratio (SINR) calculator for determining a lower limit of an average SINR for the received signal, and for determining the lower limit of an average SINR as CQI; and
 a transmitter for feeding back the CQI to the base station,
 wherein the average SINR calculator determines a numerator term of the average SINR using a definition of a weighted chordal distance and a triangle law.

7. The terminal of claim 6, wherein the average SINR calculator determines a denominator term of the average SINR using decomposition of a matrix having an orthogonal basis of a channel matrix for a channel established to the base station, determines the average SINR using the determined numerator term and denominator term, and determines a lower limit of the average SINR depending on a power level of the signal transmitted from the base station.

8. The terminal of claim 6, wherein the terminal does not recognize channels between the base station and other terminals except for the established channel.

9. The terminal of claim 6, wherein the CQI is used by the base station to generate a precoding matrix defined by a block diagonalization technique.

10. The terminal of claim 6, wherein the average SINR calculator determines the denominator term of the average SINR by decomposing the matrix having an orthogonal basis of the channel matrix for the channel established to the base station using at least (i) a codeword constituting a codebook, (ii) a matrix having an orthogonal basis of a left-null space of the codeword, (iii) an upper triangular matrix of the codeword, and (iv) a unitary matrix.

11. A method for feeding back Channel Quality Information (CQI) by a terminal in a Multi-User Multi-Input Multi-Output (MU-MIMO) communication system, the method comprising:
 determining a lower limit of an average Signal to Interference plus Noise Ratio (SINR) as CQI for a received signal from a base station by determining a numerator term of the average SINR using a definition of a weighted chordal distance and a triangle law, determining a denominator term of the average SINR using decomposition of a matrix having an orthogonal basis of a channel matrix for a channel established to the base station, determining the average SINR using the determined numerator term and denominator term, and determining a lower limit of the average SINR depending on a power level of the signal transmitted from the base station; and
 feeding back the CQI to the base station.

12. The method of claim 11, wherein the terminal does not recognize channels between the base station and other terminals except for the established channel.

13. The method of claim 12, wherein the determining of the denominator term of the average SINR comprises performing the decomposition of the matrix having an orthogonal basis of the channel matrix for the channel established to the base station using at least (i) a codeword constituting a codebook, (ii) a matrix having an orthogonal basis of a left-null space of the codeword, (iii) an upper triangular matrix of the codeword, and (iv) a unitary matrix.

14. The method of claim 11, wherein the CQI is used by the base station to generate a precoding matrix defined by a block diagonalization technique.

* * * * *